(12) United States Patent
Nayak

(10) Patent No.: US 6,234,416 B1
(45) Date of Patent: May 22, 2001

(54) REEL LOCK AND COUPLING ENGAGEMENT MECHANISMS FOR A CARTRIDGE

(75) Inventor: Ashok B. Nayak, Glendora, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 0 days.

(21) Appl. No.: 09/628,511

(22) Filed: Jul. 28, 2000

Related U.S. Application Data (62) Division of application No. 09/064,838, filed on Apr. 23, 1998, now Pat. No. 6,113,020.
(60) Provisional application No. 60/051,555, filed on Jul. 2, 1997.

(51) Int. Cl.[7] .................................................. G11B 23/04
(52) U.S. Cl. ........................ 242/338.1; 242/348; 360/132
(58) Field of Search ................................. 242/338.1, 343, 242/348, 338.3; 360/132

(56) References Cited

U.S. PATENT DOCUMENTS

| | | |
|---|---|---|
| 3,706,426 | 12/1972 | Prahl . |
| 4,309,002 | 1/1982 | Saiton et al. . |
| 4,723,731 | 2/1988 | Posso . |
| 4,826,097 | 5/1989 | Grant et al. . |

Primary Examiner—John Q. Nguyen
(74) Attorney, Agent, or Firm—McDermott, Will & Emery (57) ABSTRACT

A tape cartridge is provided with reliable reel lock and motor/reel coupling mechanisms whose functions are both accomplished during a single motion of the cartridge relative to the drive motor. The motor/reel coupling includes a circular set of gear teeth on the bottom of the tape reel which meshes with a complementary set of gear teeth on a motor coupling rotated by the motor when the cartridge is loaded into the tape drive and the cartridge and motor are moved towards each other. An engagement force to maintain the coupling is provided by an engagement spring in the cartridge which biases the reel towards the motor. Reel locking is accomplished by providing a second circular set of gear teeth on a top side of the tape reel which meshes with a complementary set of gear teeth provided on a slidably mounted locking bracket inside the tape cartridge. A lock spring normally biases the locking bracket towards the top of the tape reel, thus locking the reel when the cartridge is not engaged with the motor. When the cartridge and the drive motor are moved towards each other, the motor coupling engages the bottom of the tape reel, and a projection on the motor coupling extends into the tape cartridge to slide the locking bracket out of engagement with the teeth on the top of the tape reel, thereby unlocking the reel. Thus, reel unlocking and motor/reel coupling are accomplished with a single motion by reliable mechanisms.

1 Claim, 12 Drawing Sheets

REEL LOCK AND COUPLING ENGAGEMENT MECHANISMS FOR A CARTRIDGE

This application is a Divisional of Application Ser. No. 09/064,838 filed Apr. 23, 1998, U.S. Pat. No. 6,113,020.

This application is based on U.S. Provisional Application Serial No. 60/051,555, filed Jul. 2, 1997.

FIELD OF THE INVENTION

The present invention relates to a cartridge for tape media stored on a reel. The invention has particular applicability to tape cartridges which require reel locks to prevent the tape from unraveling, and coupling engagement mechanisms for coupling the tape reel to a drive motor.

BACKGROUND ART

Current demands for high-density data storage and high performance and reliability require tape handling systems which store as much tape as possible on a single supply reel in a cartridge. Such demands for increased density, performance and reliability require cartridges which are as simple and rugged as possible.

Figure 1:
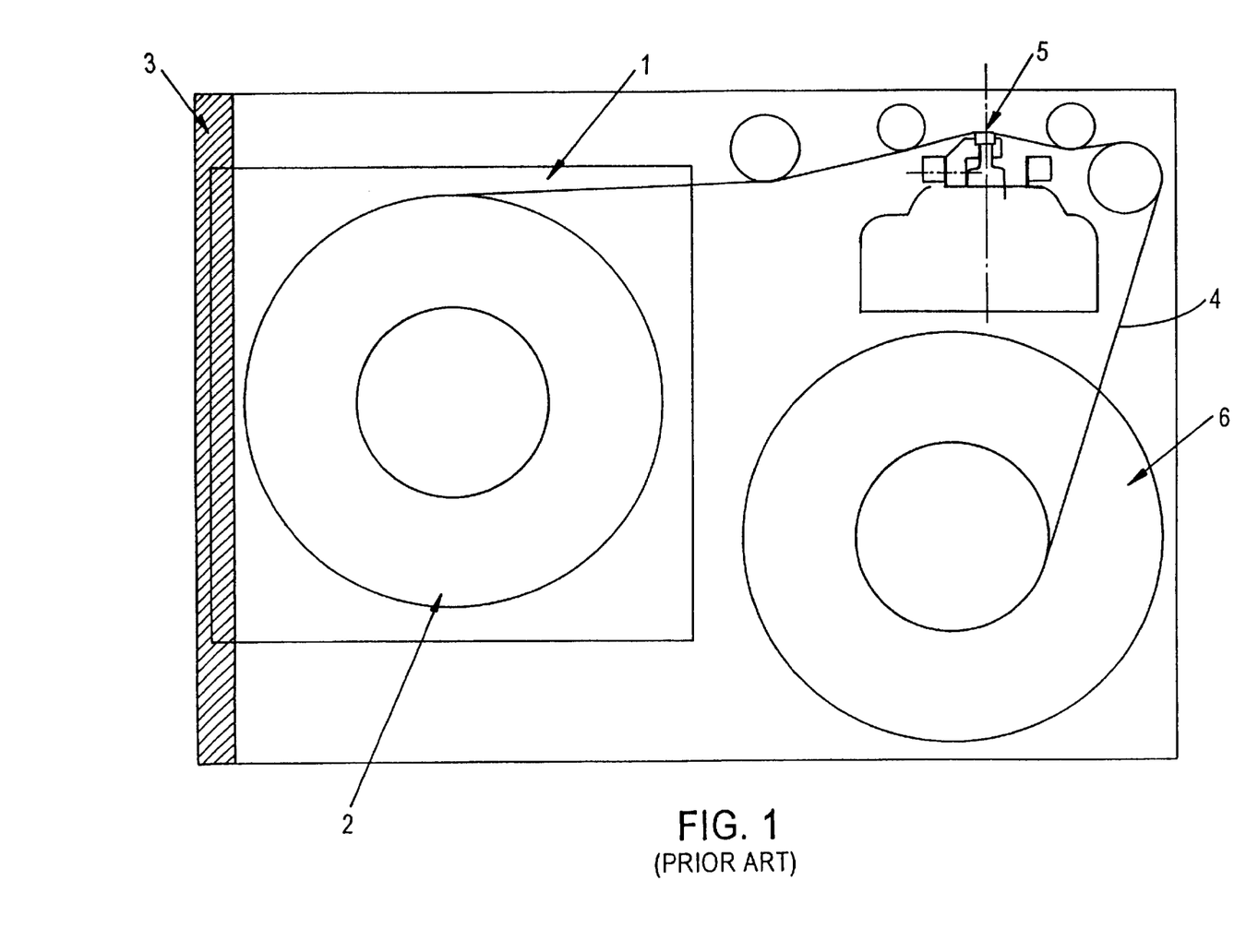
FIG. 1 is a plan view of a prior art tape drive.

Certain conventional tape drives, referring to FIG. 1, comprise a modular data cartridge 1 having a supply reel 2. The cartridge 1 is inserted into the tape drive through a front bezel 3, then the tape 4 is pulled out of the cartridge 1 and fed past a magnetic read/write head 5 and wound onto a take up reel 6, which is not removable from the tape drive. Upon rewinding the tape 4 back onto the supply reel 2, the end of the tape 4 is captured in the cartridge 1, at which time the cartridge 1 can be removed from the tape drive.

When the cartridge 1 is outside of the tape drive, the supply reel 2 must be locked to prevent it from rotating and causing the tape 4 to unravel if the tape 4 is subject to harsh environmental conditions such as shocks and vibrations. In conventional tape drive/cartridge designs, this reel locking function is typically accomplished by providing gear teeth at the outside diameter of the supply reel and a lever or levers with a corresponding gear tooth profile which are normally engaged with the supply reel gear teeth by means of a spring force. When the cartridge is inserted into the tape drive, mechanisms inside the tape drive disengage the lever(s) from the supply reel gear teeth and allow the supply reel to rotate.

These conventional external reel locks are disadvantageous because they are complex and require a large number of parts, which makes them unreliable and costly. Furthermore, because they have a number of separate mechanisms which must operate separately when the cartridge is loaded into the tape drive, they slow down the operation of the tape drive.

Referring again to FIG. 1, to move the tape 4 from the supply reel 2 to the take up reel 6, the supply reel 2 is normally rotated by a motor (not shown). For the supply reel 2 to rotate, it must therefore engage the motor, and an adequate engagement force must be applied between the motor and the supply reel 2 to maintain their engagement. The supply reel 2 should also easily disengage from the motor when the cartridge 1 is to be removed from the tape drive. In conventional tape drive/cartridge designs, a magnetic coupling scheme is typically employed which utilizes the principle that a holding force exists when a magnetically soft material, such as steel, is in contact with a permanent magnet. In such a magnetic coupling design, a steel plate is attached to the supply reel of the cartridge and a ring-shaped, axially magnetized permanent magnet is attached to the motor coupling. When the supply reel is brought into contact with the motor coupling, the steel plate comes into contact with the magnet on the motor coupling, thereby coupling the motor and the supply reel.

The holding force of the magnetic coupling depends on the strength of the magnetic material. Additionally, the force between the steel plate and the permanent magnet is inversely proportional to the distance between them. The force has a maximum value when the steel and the magnet are at zero distance from each other; that is, when they are in contact with each other. The amount of force decreases as the distance between the steel and magnet increases. Thus, depending on the strength of the magnet, the force will become essentially zero at a certain distance between the steel plate and the magnet. Disadvantageously, the condition of zero force between the steel plate and the magnet may not be attainable in the short distance desired for coupling engagement/disengagement travel; that is, if there is limited space available between the steel plate and the magnet. Thus, in applications in which compactness is at a premium, complete disengagement (zero force) may not be achievable with magnetic coupling.

Another disadvantage to the magnetic coupling scheme is that because the force between the steel and the magnet is at a maximum when they are coupled, an undesirable impact force to the cartridge may be created when the cartridge is disengaged from the motor coupling. Also, when the motor coupling and the supply reel are being engaged, the magnet may "grab" the supply reel; that is, pull the reel towards it with a jerk, undesirably impacting the reel.

Furthermore, the magnetic properties of the permanent magnet vary with temperature. Since the motor coupling is close to the motor and attached to the motor shaft, it may reach the same temperature as the motor, thus undesirably altering the magnitude of the coupling force. Still further, the height of the magnet undesirably increases the overall coupling height. Moreover, the need to adhesively bond the magnet to the motor coupling and to bond the steel plate to the supply reel add additional assembly operations to the manufacture of the tape drive and the cartridge.

There exists a need for a tape cartridge with uncomplicated and reliable reel lock and motor/reel coupling engagement systems. There also exists a need for a reel lock and a coupling mechanism which are both activated by a single motion of the cartridge or drive motor, thus reducing the complexity of and the time required for the cartridge loading operation.

SUMMARY OF THE INVENTION

These and other needs are met by certain embodiments of the present invention which provide a tape cartridge that overcomes the disadvantages of external reel locks and magnetic couplings by employing internal reel locking and coupling mechanisms which are activated by a single motion of the cartridge, thereby enhancing the reliability of the tape cartridge and tape drive, and reducing the time required for the cartridge loading operation.

The earlier stated needs are satisfied by the present invention which provides a tape cartridge comprising a tape reel having a reel coupling engageable with a motor coupling for rotation of the tape reel and a cartridge shell for housing the tape reel. A locking device is coupled to the cartridge shell and engageable with the tape reel to lock the tape reel against rotation. A first biasing device biases the locking device towards locking engagement with the tape reel and a second biasing device biases the tape reel towards engagement with a motor coupling. A disengagement device coupled to the locking device and engageable with a motor coupling disengages the locking device from the tape reel upon engagement of the tape reel with a motor coupling.

Another aspect of the present invention is a tape cartridge having a tape reel with a central reel hub, an aperture coaxial with an axis of rotation of the tape reel and a reel coupling engageable with a corresponding motor coupling, and a cartridge shell for housing the tape reel. A first locking member, coaxial with the axis of rotation of the tape reel, has a circular rib protruding upward from the bottom of the reel hub. A lock bracket, coaxial with the axis of rotation of the tape reel, has a hollow central hub with a plurality of radiating arms, and a second locking member comprising a continuous annular ring supported by the plurality of arms and engageable with the first locking member. The locking bracket also has a disengagement protrusion, extending downward from a bottom surface of the hub into the aperture, which abuts a center post of the motor coupling when the motor coupling and the reel coupling are engaged, for disengaging the first and second locking members.

In certain embodiments, a lock spring is provided for biasing the second locking member towards the first locking member, and a lock spring guide locates the lock spring. One end of the lock spring abuts the cartridge shell, the other end of the lock spring abuts the bottom surface of the hub of the locking bracket, and the hub of the locking bracket is slidably supported on the lock spring guide for motion in an axial direction. An engagement spring, having a first end and a second end, biases the tape reel towards the motor coupling when the motor coupling and reel coupling are engaged and biases the tape reel towards a bottom surface of the cartridge shell when the motor coupling and the reel coupling are disengaged. A plurality of spokes protrude downwardly from the top surface of the cartridge shell and extend between the plurality of arms of the locking bracket for preventing rotation of the locking bracket. Each of the plurality of spokes has a seating device for seating a portion of the first end of the engagement spring. A ball bearing having an inner race is mounted coaxial with the aperture and protrudes upwardly from the bottom of the reel hub, and a spring retainer is mounted to an outer race of the ball bearing for supporting the second end of the engagement spring. The first and second locking members are engaged when the motor coupling and the reel coupling are disengaged, and the first and second locking members are disengaged when the motor coupling and the reel coupling are engaged.

A further aspect of the present invention is a tape drive having a motor with a motor coupling for rotating a tape reel housed in a cartridge shell, the motor coupling comprising a circular set of gear teeth coaxial with the axis of rotation of the motor and engageable with a corresponding set of gear teeth in the tape reel; and a center post at the axis of rotation of the motor insertable into an aperture at the center of the tape reel for unlocking the tape reel from the cartridge shell.

The present invention avoids the complexity and resulting high cost and lack of reliability of conventional external reel locks by providing an internal reel locking mechanism which operates with a single vertical motion. With its toothed reel/motor coupling having consistent engagement force provided by a mechanical biasing device on demand, the present invention eliminates the coupling and uncoupling impact to the tape reel inherent in magnetic couplings, as well as their complexity and unreliability due to temperature variations. Moreover, the present invention further reduces design complexity of the tape drive and cartridge and increases their reliability by providing a reel lock and coupling mechanism which are both activated by a single motion of the cartridge or drive motor, rather than by separate motions as per conventional designs.

Additional features and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein:

FIG. 11b is a cross-sectional view taken along the line A—A in FIG. 11a.

DETAILED DESCRIPTION OF THE ILLUSTRATIVE EMBODIMENTS

The present invention addresses and solves the problems of conventional tape cartridges stemming from the use of magnetic couplings for the supply reel and drive motor, and external reel locks which are actuated by separate mechanisms. External reel locks and magnetic couplings are both complex and unreliable. Furthermore, magnetic couplings subject the tape cartridge to undesirable impact forces. Still further, because external reel locks and magnetic couplings require separate actuation, they increase the complexity of the cartridge and the tape drive. The present invention provides simple and reliable reel lock and motor/reel coupling mechanisms whose functions are both accomplished during a single motion of the cartridge relative to the drive motor.

According to the present invention, the motor/reel coupling is accomplished by providing a circular set of gear teeth on the bottom of the tape reel which meshes with a complementary set of gear teeth on a motor coupling rotated by the motor, when the cartridge is loaded into the tape drive and the cartridge and motor are brought together. An engagement force to maintain the coupling is provided by an engagement spring in the cartridge that biases the reel towards the motor. Reel locking is accomplished by providing a second circular set of gear teeth or the like on a top side of the tape reel which meshes with a complementary set of gear teeth or the like provided on a slidably mounted locking bracket inside the tape cartridge. A lock spring normally biases the locking bracket towards the top of the tape reel, thus locking the reel when the cartridge is not engaged with the motor. When the cartridge and the drive motor are brought together, the motor coupling engages the bottom of the tape reel, and a projection on the motor coupling extends into the tape cartridge to slide the locking bracket out of engagement with the teeth on the top of the tape reel, thereby unlocking the reel. Thus, reel unlocking and motor/reel coupling are accomplished with a single motion by simple, reliable mechanisms.

Figure 2:
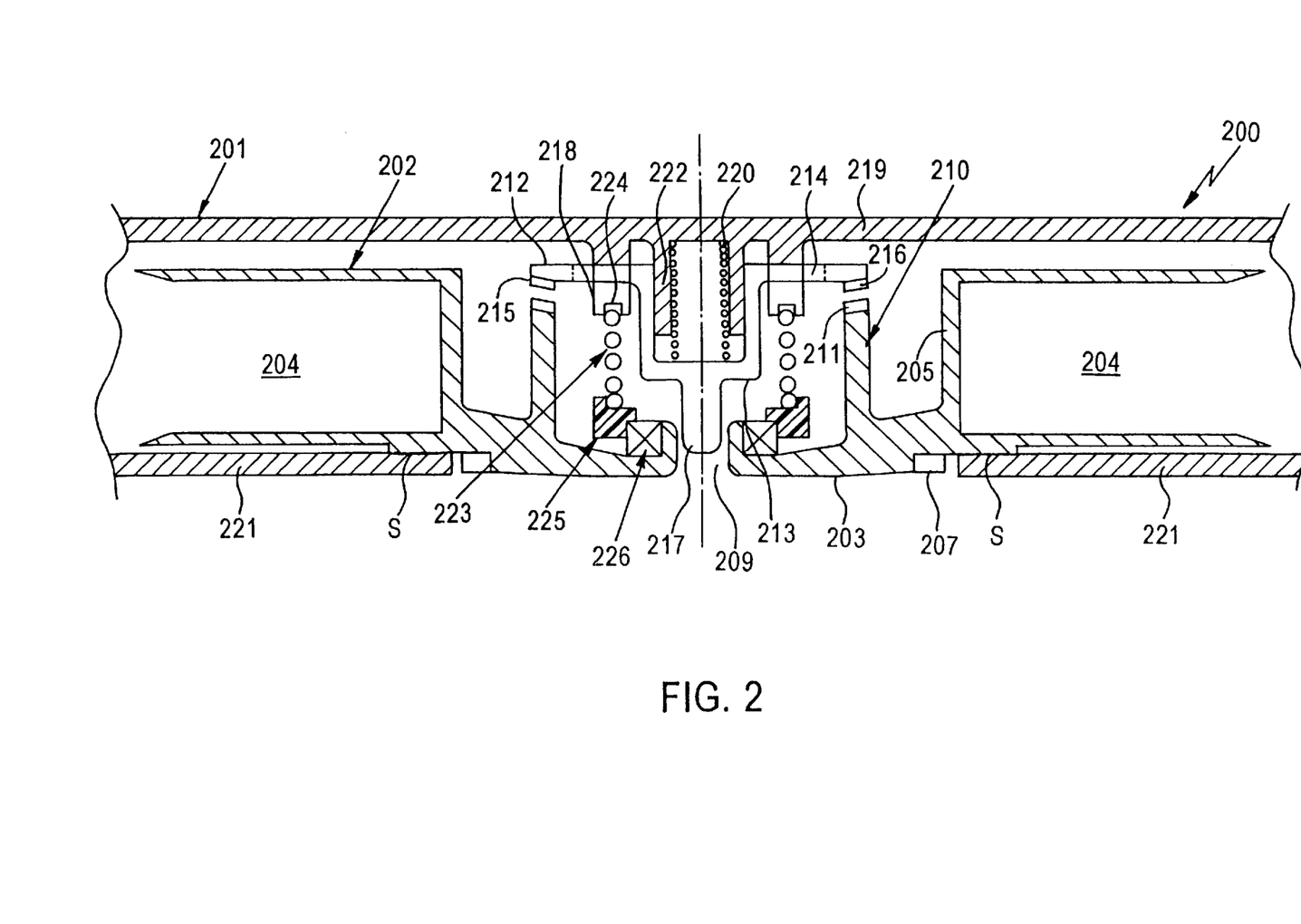
FIG. 2 is a cross-sectional view of a tape cartridge according to the present invention.
Figure 3:
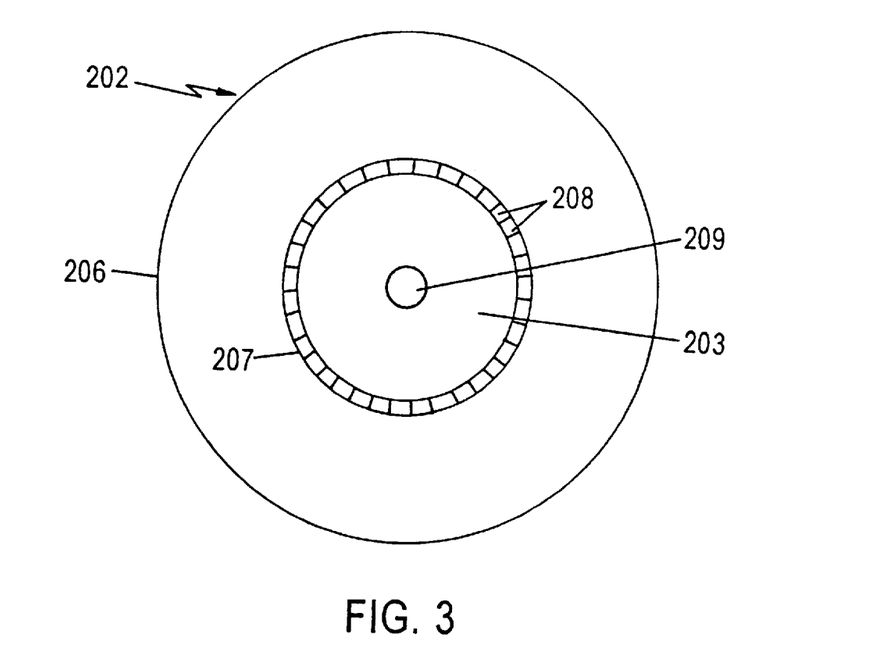
FIG. 3 is a bottom view of a tape reel according to the present invention.
Figure 4:
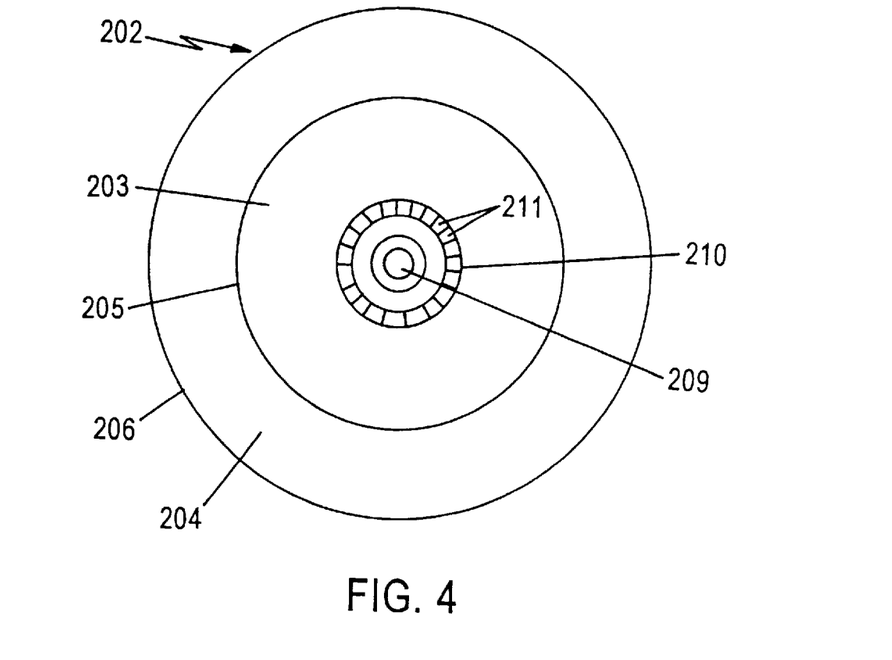
FIG. 4 is a top view of a tape reel according to the present invention.

An embodiment of the invention will now be described with reference to the drawings. As depicted in FIGS. 2–4, the inventive tape cartridge 200 comprises a cartridge shell 201 which houses a tape reel 202. The tape reel 202 has a central reel hub 203 and a tape loading area 204, which is defined by an inner flange 205 and an outer diameter 206 of the reel 202.

Figure 5:
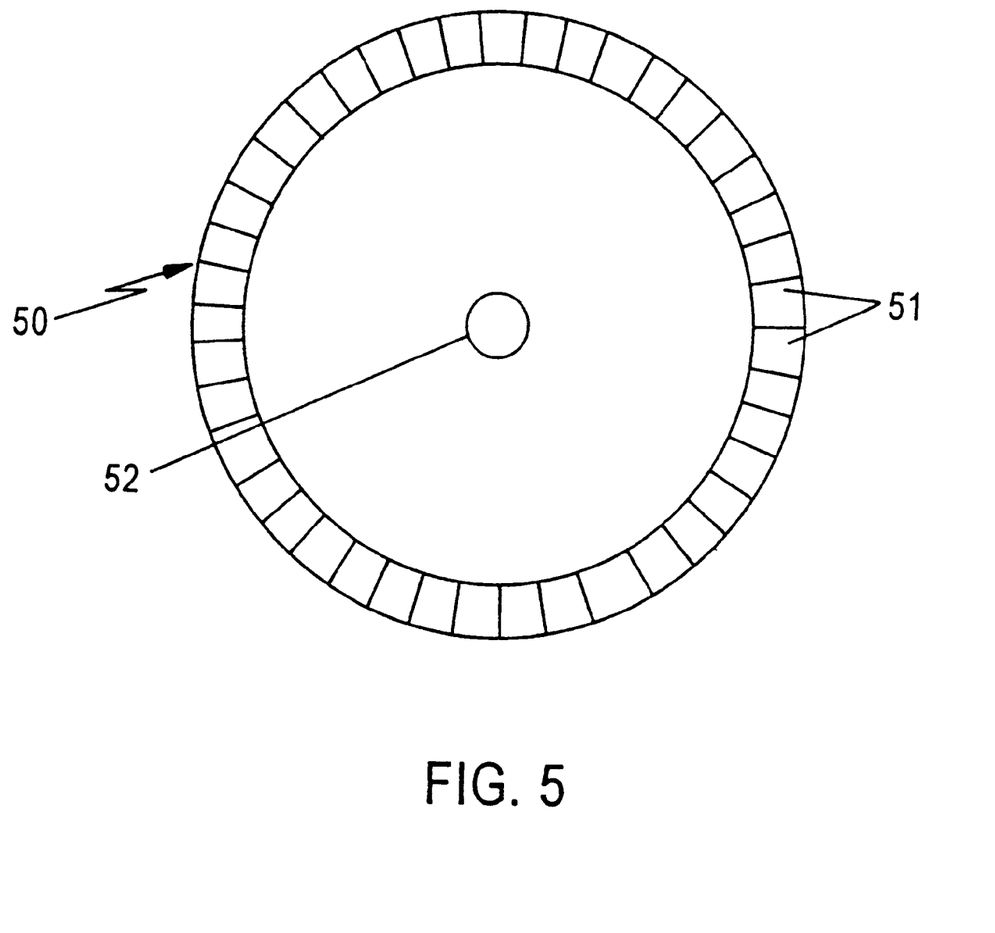
FIG. 5 is a top view of a motor coupling for use with a tape cartridge of the present invention.

As best shown in FIG. 3, a reel coupling 207 is formed on a bottom surface of the reel hub 203, and comprises a circular ring of gear teeth 208 which is coaxial with the axis of rotation of the tape reel 202. The bottom of the reel hub 203 also has a central aperture 209. The reel coupling 207 mates with motor coupling 50, as shown in FIG. 5, to rotate the tape reel 202. Motor coupling 50 includes a circular ring of gear teeth 51 which corresponds to ring of gear teeth 208, and also has a center post 52 which is sized to engage the aperture 209 on the bottom of the reel hub 203 and to extend into the reel hub 203. In the exemplary embodiment, the center post 52 has a spherical end, to facilitate engagement with the aperture 209. However, the center post 52 and aperture 209 have other complementary shapes in alternative embodiments, including polygonal shapes such as pentagons, hexagons, etc. As depicted in FIGS. 2 and 4, the upper surface of the reel hub 203 includes an upwardly protruding circular rib 210 which has a ring of gear teeth 211 on its top edge.

Figure 6:
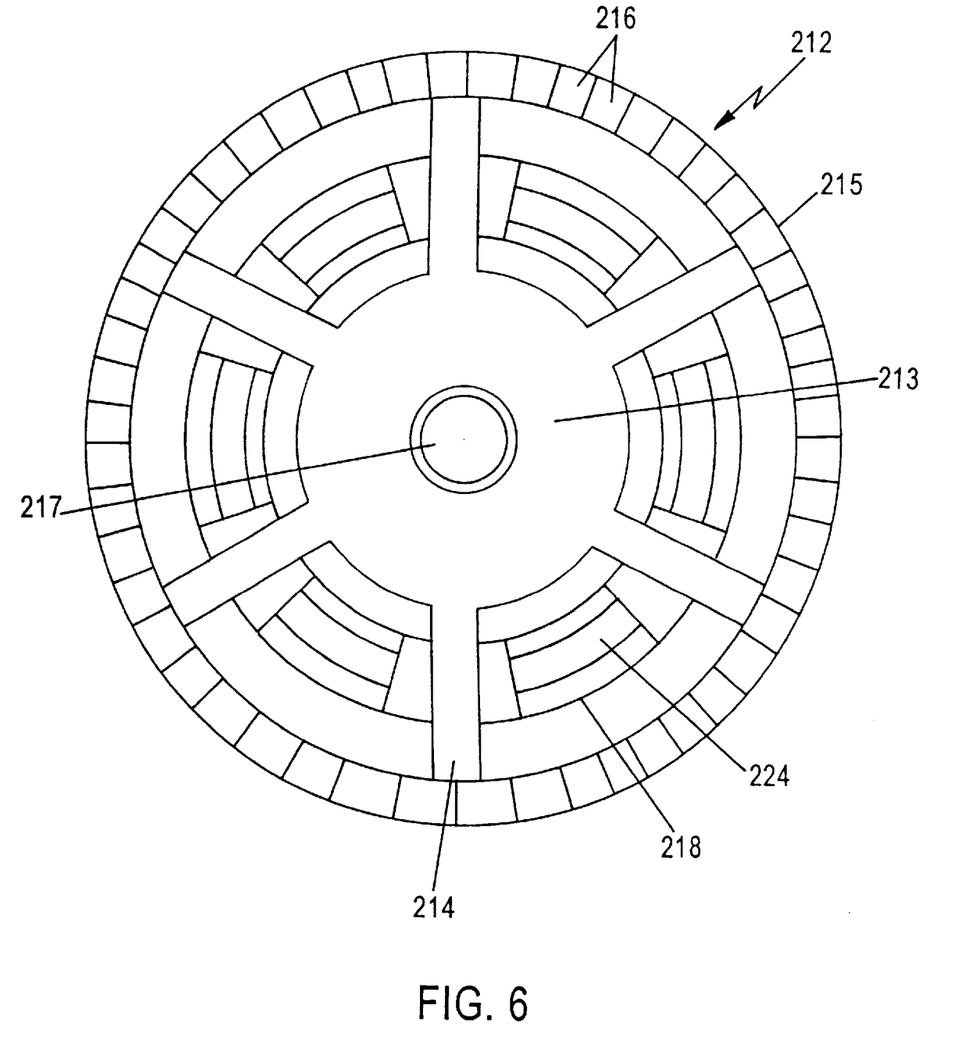
FIG. 6 is a bottom view of a lock bracket and cartridge shell according to the present invention.

Referring to FIGS. 2 and 6, a lock bracket 212, which acts as a locking device, is also provided in the tape cartridge 200. The lock bracket 212 has a hollow central hub 213, a plurality of equally spaced arms 214 radiating from the hub 213, and a continuous circular ring 215 supported by the plurality of arms 214. The lock bracket 212 also has an unlocking protrusion 217, which acts as a disengagement device, extending downward from the bottom of the central hub 213 and fitting into the aperture 209 in the reel hub 203 to abut the center post 52 of the motor coupling 50 and disengage the tape reel lock. The unlocking protrusion 217 preferably does not protrude out the bottom of the reel hub 203 at any time. The ring 215 carries a row of gear teeth 216 which correspond to gear teeth 211 on the circular rib 210 of the reel hub 203, and which mesh with the gear teeth 211 to lock the reel 202 and the lock bracket 212 together. Note that for clarity FIG. 2 depicts the lock bracket 212 in an unlocked position. This is the position in which the tape cartridge 200 is loaded in a tape drive and the tape can be pulled out of the cartridge. When the cartridge 200 is not loaded into a tape drive, the lock bracket 212 is in its locked position (not shown), with gear teeth 211 and 216 enmeshed.

In alternative embodiments of the invention, the complementary rows of gear teeth 211, 216 are replaced by complementary axial knurls, which are essentially much smaller and more numerous gear teeth. However, the above-described gear teeth 211, 216 are preferred because of their superior torque-handling ability, which increases the effort required to move the tape reel 202 while it is locked, thereby preventing inadvertent rotation of the tape reel 202 when it is locked.

The lock bracket 212 is assembled to the cartridge shell 201 so that it cannot rotate. This is accomplished by the provision of a plurality of equally spaced spokes 218 depicted in FIGS. 2 and 6 which protrude downward from the top surface 219 of the cartridge shell 201 and extend between the arms 214 of the lock bracket 212. Thus, when the gear teeth 216 of the lock bracket 212 mesh with the gear teeth 211 of the reel hub 203, the reel 202 is locked and prevented from rotating. In the exemplary illustrated embodiment, six radially equally spaced arms 214 and six radially equally spaced spokes 218 are provided.

When the tape cartridge 200 is not loaded in a tape drive, the gear teeth 216 and 211 are always engaged with each other, hence locking the tape reel 202, by a helical lock spring 220, which biases the lock bracket 212 downward from the top surface 219 against the tape reel 202. In turn, the tape reel 202 is biased by the lock spring 220 against the bottom 221 of the cartridge shell 201, contacting the bottom 221 at region S (FIG. 2). Lock spring 220 is preferably made of stainless steel. The lock spring 220 is supported by and disposed inside a hollow cylindrical lock spring guide 222, which extends downward from the top surface 219 of cartridge shell 201. The top end of the lock spring 220 abuts the top surface 219 of the cartridge shell 201, and the bottom end of the lock spring 220 abuts the bottom surface of the central hub 213 of the lock bracket 212. The hub 213 of the lock bracket 212 is slidably supported on the outer diameter of the lock spring guide 222, thus allowing the lock bracket 212 to move vertically to lock and unlock the tape reel 202.

Figure 7:
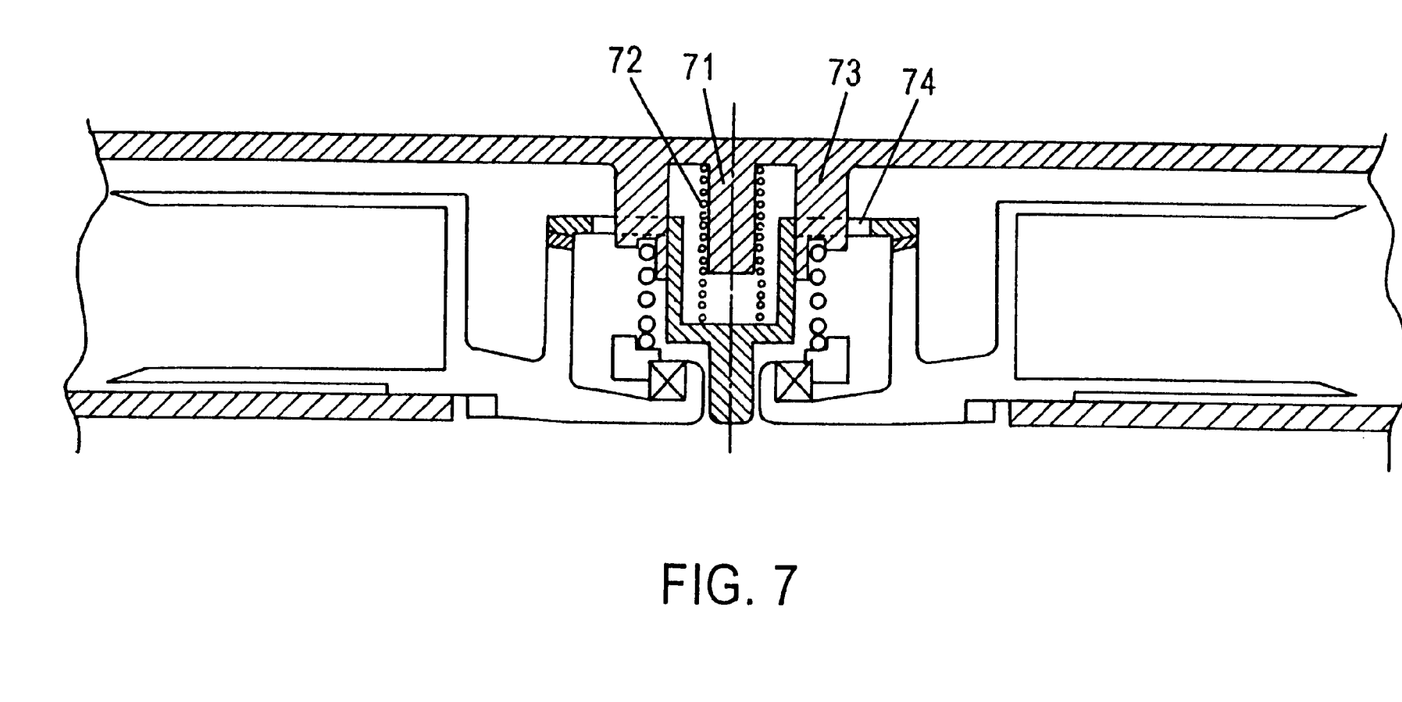
FIG. 7 is a cross-sectional view of a tape cartridge according to an alternate embodiment of the present invention.

In an alternative embodiment, depicted in FIG. 7, a lock spring support 71 is provided such that a lock spring 72 fits around its outer diameter. The spokes 73 extend through openings in a lock bracket 74. The spokes 73 slidably support the lock bracket 74 as well as prevent the lock bracket 74 from rotating.

An engagement load between the motor coupling 50 and the reel coupling 207 is provided by a helical engagement spring 223, which biases the tape reel 202 towards the motor coupling 50 when the reel coupling 207 and the motor coupling 50 are engaged. The engagement spring 223 also biases the tape reel 202 against the bottom 221 of the cartridge shell 201 when the couplings 207, 50 are disengaged. The top end of the engagement spring 223 is supported by the spokes 218, and sits in slots 224 in the distal end of spokes 218 (FIGS. 2 and 6).

Figure 8:
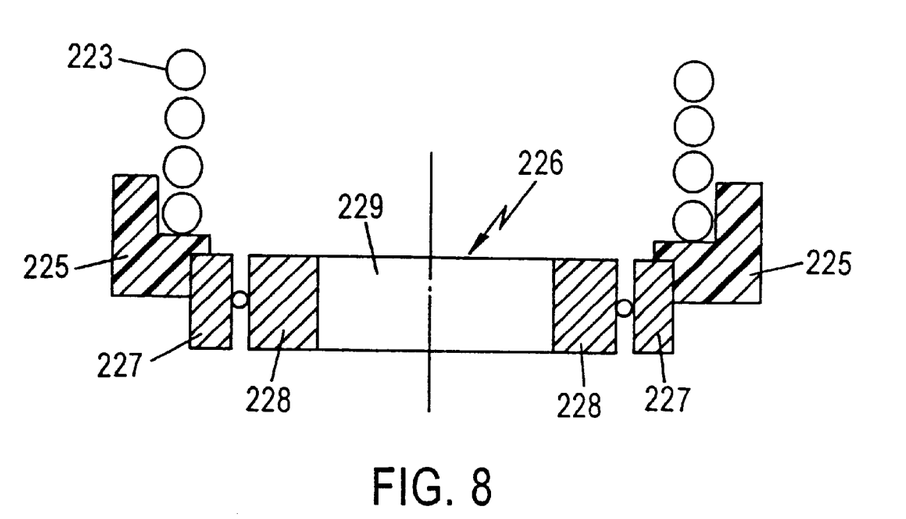
FIG. 8 is a cross-sectional view of a thrust ball bearing/ spring retainer according to the present invention.

The bottom end of the engagement spring 223 is supported, as depicted in FIGS. 2 and 8, by a spring retainer 225 which is attached to the outer race 227 of a thrust ball bearing 226 whose inner race 228 is attached to the reel hub 203 and is coaxial with the axis of rotation of the tape reel 202 and whose hollow middle portion 229 is aligned with aperture 209. When the tape reel 202 is coupled to the motor coupling 50 and rotated, the thrust ball bearing 226 absorbs the thrust of the engagement spring 223 and enables the tape reel 203 to rotate freely. The thrust ball bearing 226 is of the type having a large radial end play, which allows for misalignment between the motor coupling 50 and the reel hub 203.

Figure 9:
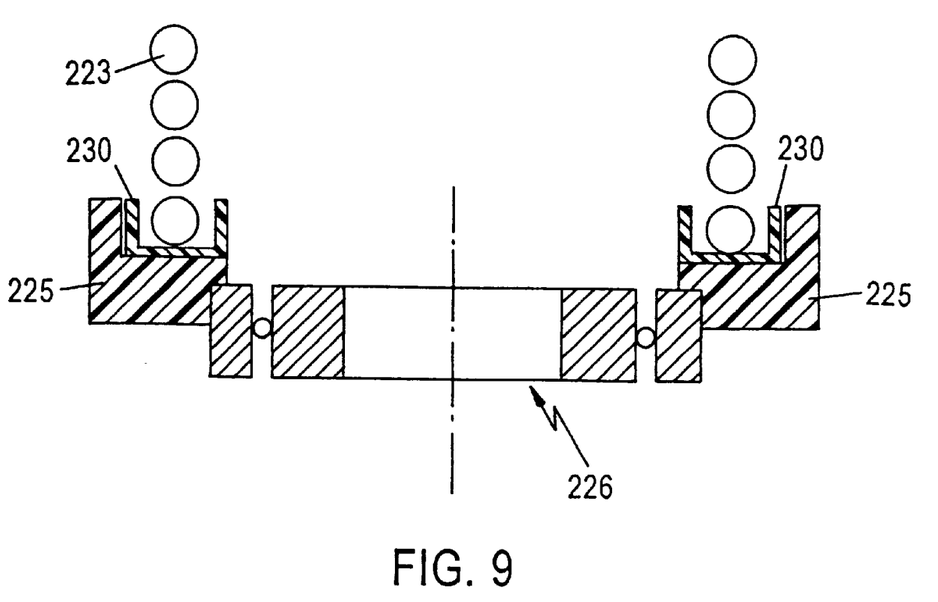
FIG. 9 is a cross-sectional view of a thrust ball bearing/ spring retainer according to an alternate embodiment of the present invention.

The engagement spring 223 is preferably made of stainless steel, to reduce the coefficient of friction between the engagement spring 223 and the spring retainer 225, which is typically made of plastic. This low coefficient of friction enhances the reliability of the tape cartridge 200 by enabling the cartridge 200 to tolerate misalignment of the motor center post 52 and the aperture 209, since the low coefficient of friction allows the spring 223 to move slightly, or "float", relative to the spring retainer 225. In an alternative embodiment, depicted in FIG. 9, to further enhance the cartridge's ability to handle misalignment with the motor coupling 50 and to minimize radial friction force from the engagement spring 223, a floating spring ring 230 is provided between the spring retainer 225 and the engagement spring 223 to further reduce the coefficient of friction between the spring retainer 225 and the engagement spring 223. The floating spring ring 230 may be made of a low friction plastic such as delrin, nylon or teflon.

Figure 10A:
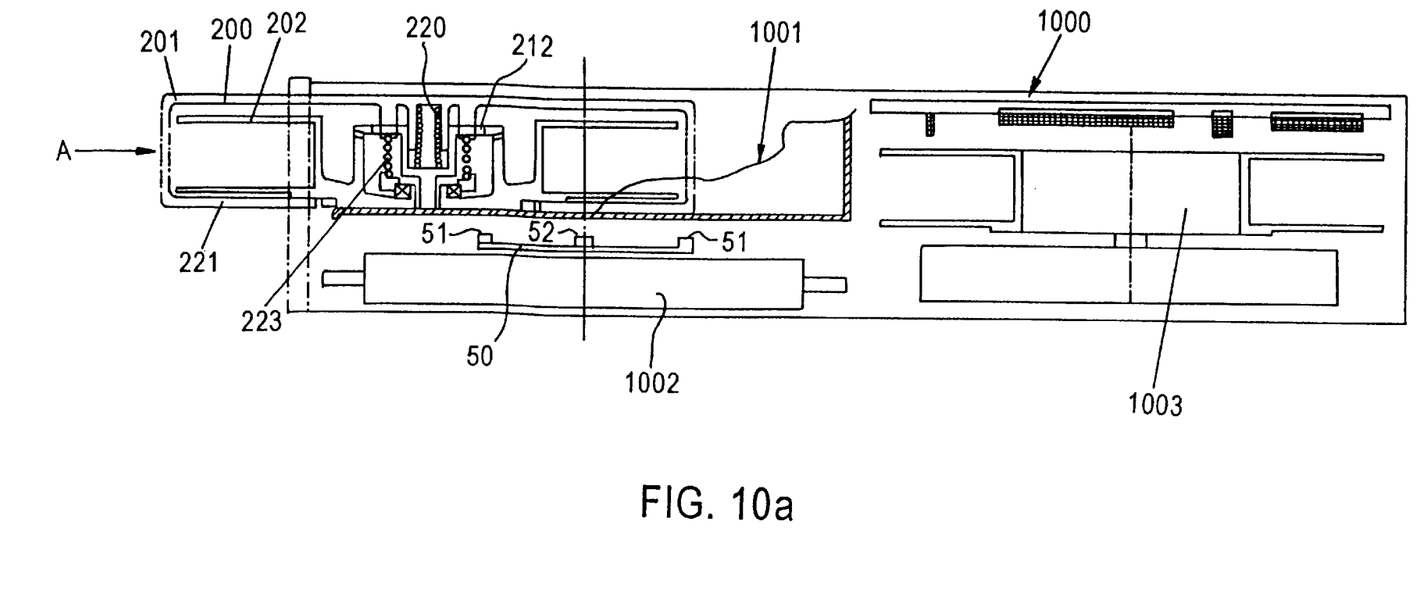
FIGS. 10a–10c illustrate the operation of the tape cartridge of the present invention.

The operation of the inventive cartridge will now be described with reference to FIGS. 10a–10c. As shown in FIG. 10a, the cartridge 200 is slid onto cartridge tray 1001 of tape drive 1000 in the direction of arrow A. The tape drive 1000 also includes a drive motor 1002 which carries motor coupling 50, and take-up reel 1003. At this time, the tape reel 202 is locked by the lock bracket 212 and is biased against the bottom surface 221 of the cartridge shell 201 by the lock spring 220 and the engagement spring 223.

Figure 10B:
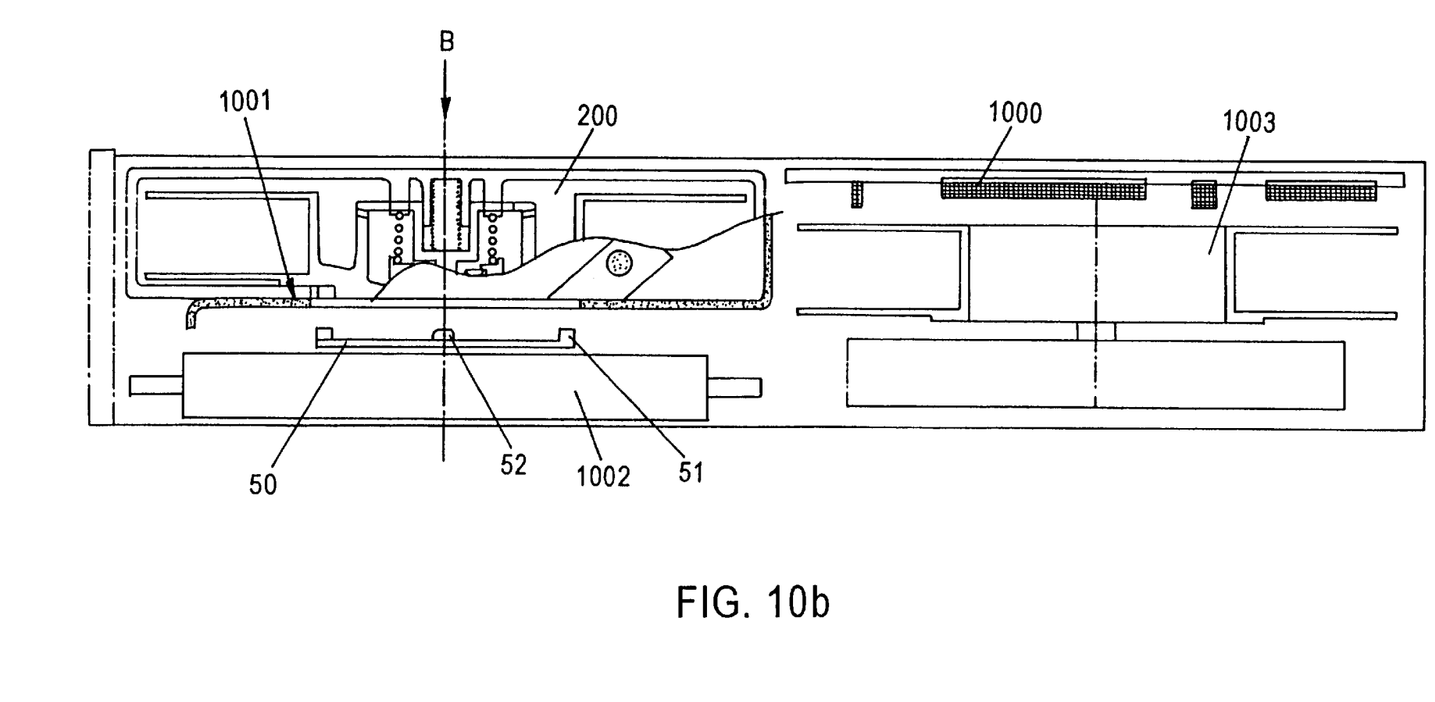

FIG. 10b depicts the cartridge 200 fully inserted into the tape drive 1000. When the cartridge 200 is in this position, a sensor or the like (not shown) recognizes that the cartridge 200 is in the correct position, and the cartridge 200 is then transported in the direction of arrow B to be loaded on the motor coupling 50. Alternatively, the cartridge 200 may be held stationary and the motor 1002 and/or motor coupling 50 moved towards the cartridge 200.

Figure 10C:
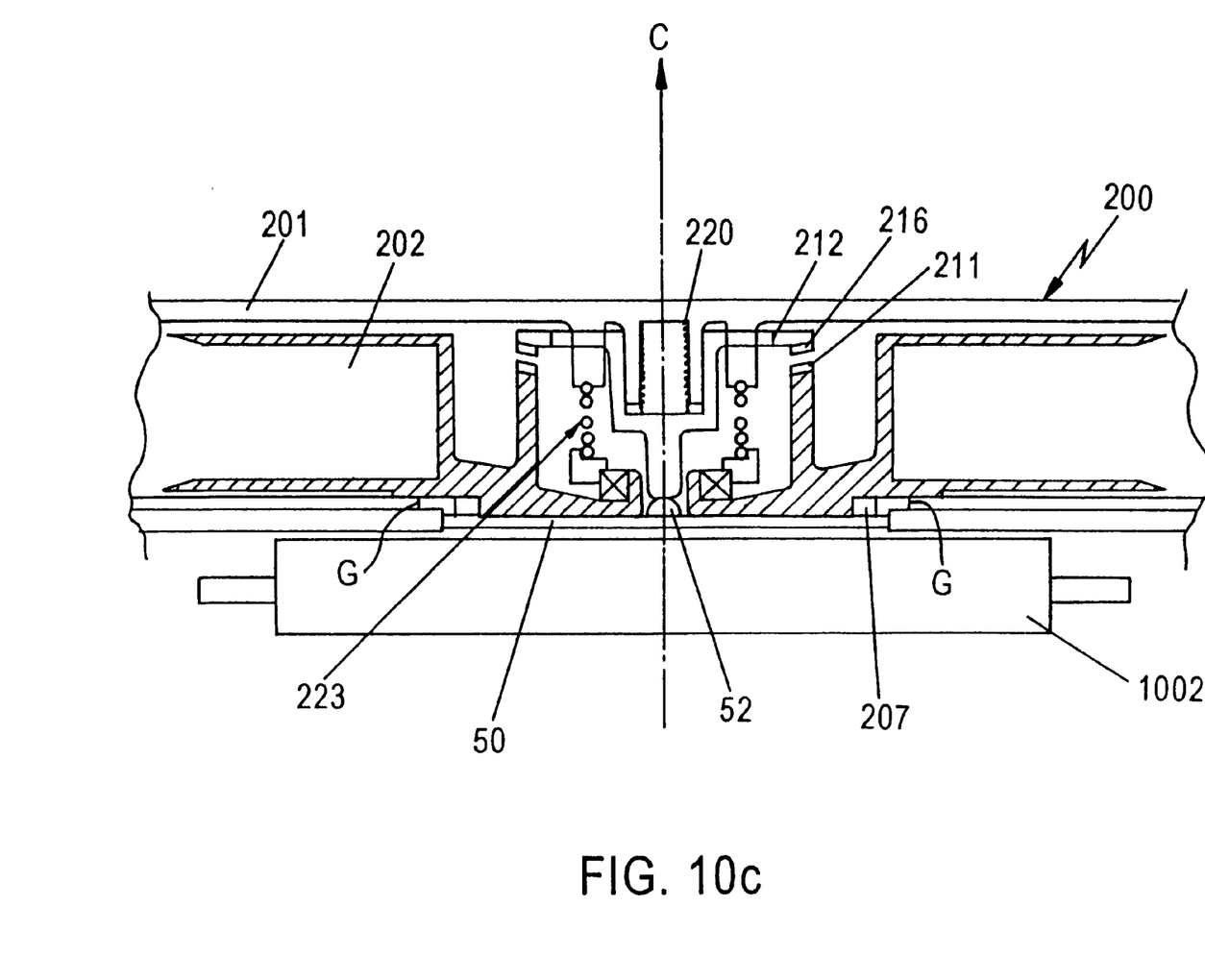

FIG. 10c shows the cartridge 200 fully loaded on the motor coupling 50. The cartridge 200 has been lowered towards the motor coupling 50, and the lock bracket 212 has been slidably lifted in the direction of arrow C against the lock spring 220 by the motor center post 52 to disengage the gear teeth 211, 216. The gear teeth 51 of the motor coupling 50 mesh with the gear teeth 207 of the tape reel 202 to fully engage the tape reel 202 to the motor coupling 50. Further downward motion has lifted the tape reel 202 against the force of the engagement spring 223, thus separating the tape reel 202 from the cartridge shell 201 and creating gap G. The engagement spring 223 now provides the engagement load between the reel coupling 207 and the motor coupling 50, and the thrust ball bearing 226 absorbs the load from the engagement spring 223 while allowing the tape reel 202 to rotate freely. Thus, with a single vertical motion (in the direction of arrow B), the tape reel 202 is unlocked and coupled to the motor coupling 50, and is ready to be rotated by the motor 1002.

Figure 11A:
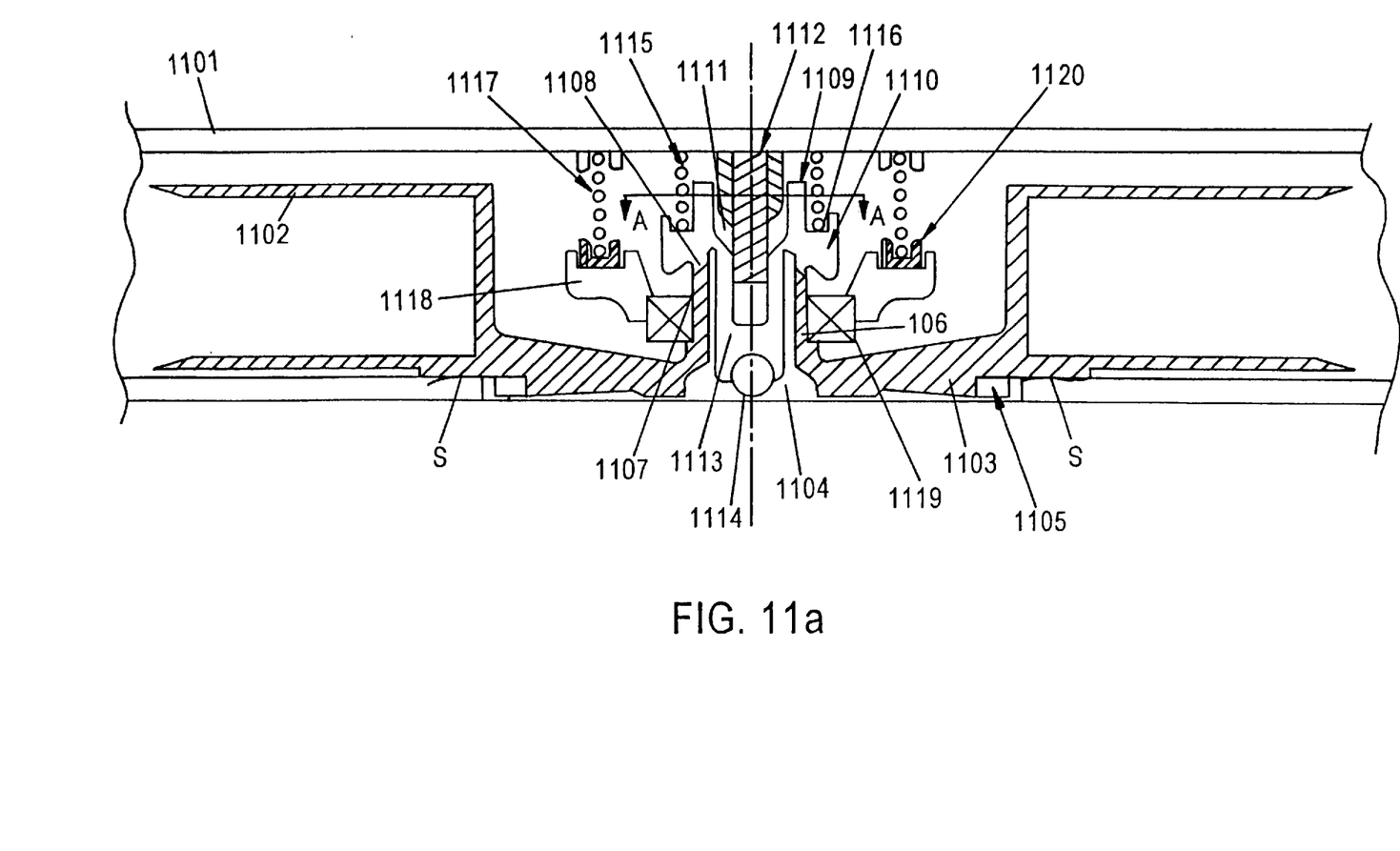
FIG. 11a is a cross-sectional view of a tape cartridge according to an alternate embodiment of the present invention.
Figure 11B:
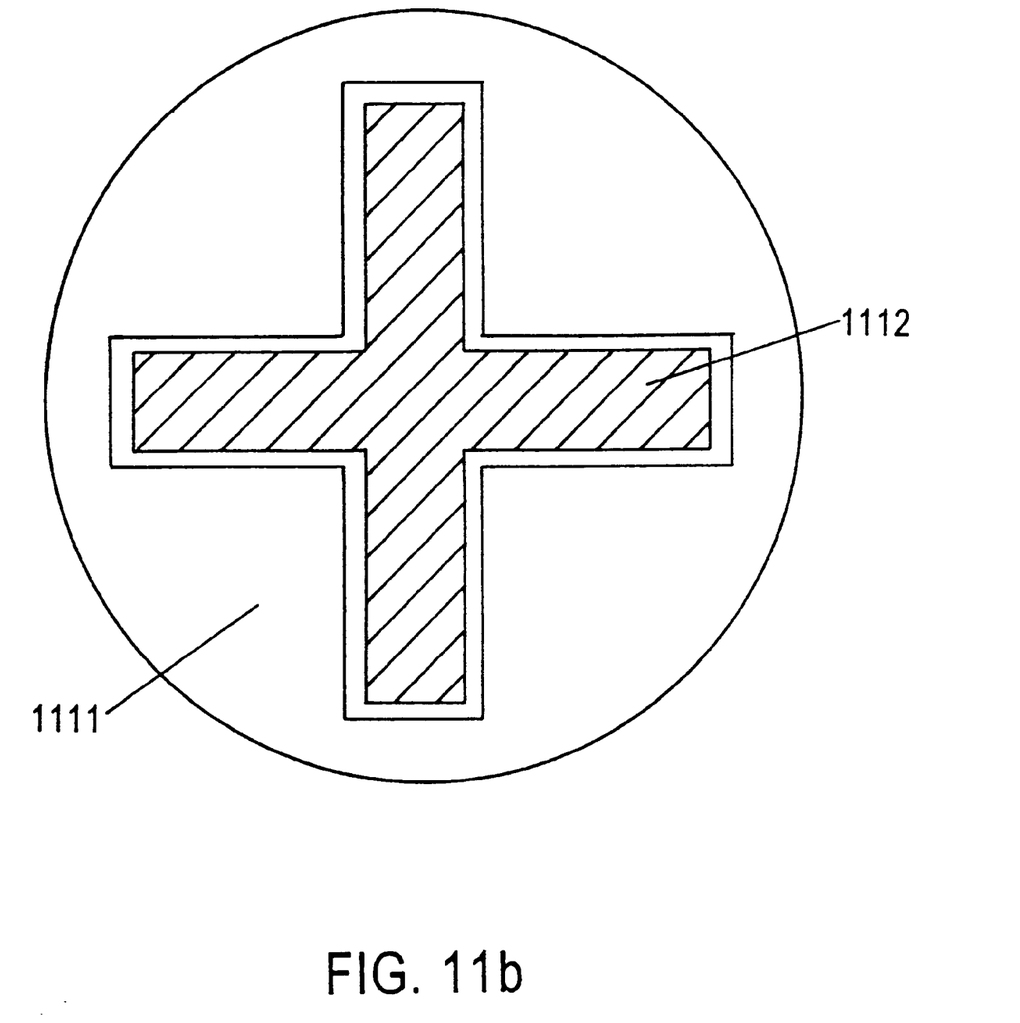

In another embodiment of the inventive tape cartridge, shown in FIG. 11a, the reel locking occurs at a diameter of the reel close to the center of the reel, although the locking and coupling operations function in substantially the same way as the previously described embodiments. This embodiment is also similar to the previously described embodiments of the inventive cartridge in that it comprises a cartridge shell 1101, a tape reel 1102 having a hub 1103 with a central aperture 1104, and a reel coupling 1105 made up of a ring of gear teeth on the reel hub 1103. However, its circular rib 106, which holds a ring of locking teeth 1107, surrounds the central aperture 1104 and meshes with a complementary ring of teeth 1108 on an increased diameter portion 1110 of its lock bracket 1109 to lock the tape reel 1102. The lock bracket 1109 has a cruciform inner cavity 1111 which engages a cruciform lock bracket guide 1112 protruding downwards from the top surface of the cartridge shell 1101 to slidably support the lock bracket 1109 and to prevent it from rotating, as shown in FIG. 11b. The lock bracket 1109 also has a disengagement protrusion 1113 engageable with a center post of a motor coupling (not shown), substantially similar to the center post 52 previously described, for lifting the lock bracket 1109 and disengaging the rings of teeth 1107, 1108, thereby unlocking the tape reel 1102. The lower end of the disengagement protrusion 1113 is a metal sphere 1114, which reduces the contact area between the lock bracket 1109 and the center post. This feature may also be incorporated into any of the previously described embodiments of the inventive tape cartridge.

A helical lock spring 1115, which biases the rings of teeth 1107, 1108 together, is supported at its bottom end on a lock spring seat 1116 formed in the increased diameter portion 1110 of the lock bracket 1109, and its top end abuts the top surface of the cartridge shell 1101. A helical engagement spring 1117, biases the tape reel 1102 towards the motor coupling when the motor coupling and the reel coupling 1105 are engaged and biases the tape reel 1102 towards the bottom of the cartridge shell 1101 (see region S) when the motor coupling and reel coupling 1105 are disengaged. The helical engagement spring 1117 is supported at its upper end by the top surface of the cartridge shell 1101. Its bottom end is supported by a spring retainer 1118 attached to the outer race of a thrust ball bearing 1119 of the type with a large radial end play, whose inner race is mounted on the circular rib 106. A low-friction floating spring ring 1120 is provided between the spring retainer 1118 and the engagement spring 1117.

The present invention provides a tape cartridge with elegant reel lock and reel/motor coupling mechanisms, wherein the functions of both mechanisms are accomplished during a single vertical motion, thereby simplifying the tape cartridge and the tape drive and improving their reliability while decreasing the time required for the tape loading operation. The present invention may be utilized in conjunction with various sizes of tape and reels.

In the previous descriptions, numerous specific details are set forth, such as specific materials, structures, etc., in order to provide a thorough understanding of the present invention. However, as one having ordinary skill in the art would recognize, the present invention can be practiced without resorting to the details specifically set forth. In other instances, well known processing structures have not been described in detail, in order not to unnecessarily obscure the present invention.

Only the preferred embodiments of the invention and but a few examples of their versatility are shown and described in the present disclosure. It is to be understood that the invention is capable of use in various other combinations and environments and is capable of changes or modifications within the scope of the inventive concept as expressed herein.

What is claimed is:

1. A tape cartridge comprising:
   a tape reel having a reel coupling engageable with a motor coupling for rotation of the tape reel;

a locking device coupled to the cartridge shell and engageable with the tape reel to lock the tape reel against rotation;

a first biasing device that biases the locking device towards locking engagement with the tape reel, said first biasing device comprising a lock spring;

a second biasing device that biases the tape reel towards engagement with the motor coupling, said second biasing device comprising an engagement spring;

a disengagement device coupled to the locking device and engageable with the motor coupling to disengage the locking device from the tape reel upon engagement of the tape reel with the motor coupling;

a first locking member, coaxial with the axis of rotation of the tape reel, comprising a circular rib surrounding an aperture and protruding upward from the bottom of the reel hub;

said locking device comprising a lock bracket, coaxial with the axis of rotation of the tape reel, comprising a cylindrical central shaft with an increased diameter portion and a cruciform inner cavity, a second locking member comprising a continuous annular ring supported by the increased diameter portion and engageable with the first locking member, and a disengagement protrusion, extending downward from a bottom surface of the central shaft into the aperture, which abuts a center post of the motor coupling when the motor coupling and the reel coupling are engaged for disengaging the first and second locking members, the distal end of the disengagement protrusion being a metal sphere, said disengagement device comprising said disengagement protrusion;

wherein one end of the lock spring abuts an inner top surface of the cartridge shell and the other end of the lock spring is seated on the increased diameter portion of the lock bracket;

a cruciform locking bracket guide downwardly protruding from a top surface of the cartridge shell and engaging the cruciform cavity of the central shaft of the lock bracket to slidably support the lock bracket for motion in an axial direction and to prevent rotation of the lock bracket;

wherein the engagement spring has a first end and a second end, and the first end abuts the inner top surface of the cartridge shell;

a thrust ball bearing, of the type with a large radial end play, having an inner race mounted surrounding the first locking member;

a spring retainer mounted to an outer race of the ball bearing for supporting the second end of the engagement spring; and a floating spring ring between the spring retainer and the second end of the engagement spring, the floating spring ring being made of a low-friction plastic;

wherein the first and second locking members are engaged when the motor coupling and the reel coupling are disengaged, and the first and second locking members are disengaged when the motor coupling and the reel coupling are engaged.

* * * * *